United States Patent Office 2,708,174
Patented May 10, 1955

2,708,174
CLINICAL DEXTRAN COMPOSITION

Homer E. Stavely, Terre Haute, Ind., assignor to Commercial Solvents Corporation, Terre Haute, Ind., a corporation of Maryland No Drawing. Application November 15, 1952,
Serial No. 320,818

6 Claims. (Cl. 127—29)

My invention relates to dextran and more particularly it relates to a new clinical dextran having a low incidence of systemic reaction.

Dextran is a bacterial polysaccharide material formed mainly by bacteria of the genus Leuconostoc as well as by some other micro-organisms. Dextran is built up of glucose units condensed into long chains and generally has a very high molecular weight.

It was found in Sweden that dextran was quite useful as a blood volume extender or blood plasma substitute when the long chains of glucose units were assembled into molecules of an average molecular weight of about 75,000. Such a material is the subject matter of U. S. Patent 2,437,518 by Gronwall and Ingelman issued March 9, 1948. Continued research on the clinical dextran produced in accordance with the above-mentioned patent has shown that there is a high incidence of systemic reaction when this material is employed. The systemic reactions referred to include itching, urticaria, dizziness, nausea, numbness, swelling, cramps, headaches, blood pressure rise, choking, flushing, soreness of muscles, etc. Before dextran was to fulfill its promise as a blood volume expander in treatment of shock and loss of blood and before it could be used in the treatment of victims of civilian disaster, battlefield casualties, etc., it was obvious that the difficulties mentioned above had to be overcome.

Clinical dextran is a material having certain chemical and physical characteristics making it suitable for use in the human body and for such use is subject to quite rigid specifications. Generally, it is employed in an injectable saline solution at a concentration of about 6%. For clinical dextran, the molecular weight must be an average of 75,000±25,000 with the lowest 5 to 10 percent being not less than 25,000 and the highest 5 to 10 percent being not more than 200,000, the molecular weight being determined by light scattering according to the principles of Doty and Steiner, Journal of Chemical Physics, vol. 18, page 1211 (1950). Similarly, the viscosity of a 6% solution must be not less than 2.5 nor more than 3.5 centistokes at 25° C. and the pH not less than 5 nor more than 7. For clinical purposes, the dextran solution must contain not less than 5.7 nor more than 6.3 gm. of dextran per 100 ml. of solution. As for sodium chloride content, a 6% aqueous solution of clinical dextran must contain not less than 0.85 gm. and not more than 0.95 gm. of sodium chloride per 100 ml. The solution must be stable, clear, colorless or faint yellow, odorless, and non-toxic. It must be sterile, non-pyrogenic and contain no preservative. Additional specifications as to ash content, nitrogen content, etc. have been set up.

I have now discovered a new clinical dextran composition which when administered to human beings has a very low incidence of systemic reaction. Furthermore, my new clinical dextran composition when administered to human beings has a negligible incidence of antibody formation and a low incidence of cutaneous reaction. In view of my invention, it is now practical to employ clinical dextran for treatment of patients suffering from shock, loss of blood, etc. and to use dextran, which requires no refrigeration, in the treatment of battlefield casualties where the use of blood plasma, which is difficult to obtain in quantity, is inconvenient because of the necessity of refrigeration.

My new clinical dextran composition is distinguishable from all other clinical dextran compositions by the manner in which the glucose units are linked. Since as mentioned above dextran is made up of glucose units, it is obvious that the glucose units can be linked in various ways since glucose has six carbon atoms in a chain. So far, three different linkages have been reported by various investigators. These are from the number one carbon atom in one glucose unit to the number six carbon atom in the adjacent glucose unit, from the number one carbon atom in a glucose unit to the number four carbon atom in the adjacent glucose unit, and from the number one carbon atom of a glucose unit to the number three carbon atom of the adjacent glucose unit. In my new essentially homogenous clinical dextran material, an average of at least 95% of all the glucose units contained therein are connected by a 1–6 linkage and not over 5% of the glucose units are connected by a linkage other than a 1–6 linkage.

The identification of linkages in dextran can be carried out by periodate oxidation which is known to be an index to the structure of polyhydroxy compounds. On periodate oxidation of dextran made up of glucose units linked by a 1 to 6 linkage, 1 mole of formic acid is produced per anhydroglucose unit and 2 moles of periodate are reduced. If the dextran is made up of glucose units linked by a 1–4 linkage no formic acid is produced and 1 mole of periodate is reduced. If the dextran is made up of glucose units linked by a 1–3 linkage, no formic acid is produced and no periodate is reduced. Periodate oxidation can be conducted in the manner of Jeanes and Wilham, Journal of the American Chemical Society, vol. 72, page 2655. Since dextran made up of glucose units linked by a 1–6 linkage is the only instance wherein formic acid is produced, then in any particular sample of dextran the amount of formic acid in moles actually produced per anhydroglucose unit multiplied by 100 will give in percent of all linkages, the 1–6 linkages in that particular dextran sample. Since three extra formic acid molecules are produced from the end glucose unit in the chain, a correction must be made or the percentage obtained as described above will be slightly higher than the actual percentage of 1–6 linkages in the particular sample.

The following table gives the results of the periodate oxidation of a number of samples of my new clinical dextran composition, the results all being corrected for the extra formic acid formed from the end glucose unit in the chain. The results are expressed in percent 1–6 linkages and if the percentage figures are divided by 100 the resulting figure is the number of moles of formic acid produced per mole of glucose unit.

TABLE I

| Clinical Dextran Sample No. | 1–6 Linkages, Percent |
|---|---|
| 511010 | 97 |
| 510726 | 97.5 |
| 510816 | 98 |
| 253 Du | 98.4 |
| N306 | 98.5 |
| N308 | 99.5 |
| Composite K | 99 |
| 255F4 | 97 |
| 258L6 | 98.8 |
| Composite Y2 | 95.5 |
| N428 | 96 |
| N432 | 95.5 |
| 259K | 97.8 |
| N449 | 97.2 |
| Composite Z | 96.6 |
| Composite AA | 97.5 |
| 262S6 | 98.1 |

The following table gives the results of periodate oxidation of a number of known dextran materials, the results being expressed in the same manner as in Table I above.

TABLE II

| Clinical Dextran | 1-6 Linkages, Percent |
| --- | --- |
| Swedish | 90.5 |
| English (Sample I) | 86 |
| English (Sample II) | 89.8 |

It can be seen from a consideration of the data in the above tables, that my new clinical dextran composition is structurally different from previously known clinical dextran compositions. This difference has a decided effect on the incidence of systemic and cutaneous reactions as will be hereafter shown.

A group of 70 patients was infused with various 6% aqueous solutions of my new clinical dextran composition and the patients then watched for systemic reactions which were classified as severe, moderate, and mild. The reactions were called severe if the patient had a combination of symptoms of marked degree. A reaction was classed as severe in any patient with flushing, urticaria and/or angioneurotic edema and/or wheezing. Any patient with marked vasomotor instability was classed as severe. The results of 70 infusions of my new clinical dextran composition are shown in the following table. It should be noted that none of the reactions were classed as severe.

TABLE III

*New dextran systemic reaction*

| Lot Number | Number Patients | Number Reactions | Percent of Total | Severity of Reaction |
| --- | --- | --- | --- | --- |
| 84512A | 5 | 1 | 20.0 | Mild. |
| 84519A | 11 | 0 | 0 | |
| 84681A | 14 | 1 | 7.1 | Mild. |
| 84684A | 31 | 4 | 12.9 | 1 Moderate. 3 Mild. |
| 84686A | 9 | 0 | 0 | |
| Total | 70 | 6 | 8.5 | |

A group of 64 patients were infused with Swedish dextran having an average of about 90% 1-6 linkages among the glucose units linked together and the results of these 64 infusions are shown in the following table. The severity of the reactions noted were classed as in Table III above.

TABLE IV

*Swedish dextran systemic reaction*

| Lot Number | Number Patients | Number Reactions | Percent of Total | Severity of Reaction |
| --- | --- | --- | --- | --- |
| Y5328A | 11 | 6 | 54.5 | 2 Severe. 3 Moderate. 1 Mild. |
| Y5656A | 12 | 4 | 33.3 | 4 Severe. |
| Y5740A | 25 | 13 | 52.0 | 6 Severe. 4 Moderate. 3 Mild. |
| Y57402A | 11 | 8 | 72.7 | 3 Severe. 2 Moderate. 3 Mild. |
| Z6932A | 5 | 2 | 40.0 | 2 Moderate. |
| Total | 64 | 33 | 51.5 | |

The 15 patients classed as having severe reactions in Table IV above experienced the following objective signs and subjective symptoms: flushing—13 times, urticaria and angioneurotic edema—14 times, wheezing and choking—6 times, vasomotor instability (inability to maintain blood pressure on standing)—8 times, rise in blood pressure—3 times, swelling of extremities—6 times, nausea and/or vomiting—2 times, vasomotor rhinitis—1 time, abdominal pain—2 times, abdominal cramps—1 time, chest pain and substernal soreness of muscles—2 times, headache—1 time, numbness of hands—1 time, ache in shoulders and back—3 times.

One of the patients given Swedish dextran lot number Y5656A reacted in the following manner. The patient, having no allergic history, was given 1000 cc. of a 6% solution of Swedish dextran in 47 minutes and 24 minutes after infusion was started his face flushed and his head began to feel heavy. After 29 minutes his lips began to swell and after 34 minutes severe urticaria appeared on his arm where a tourniquet had been placed for needle insertion. Pain in the low back was also noticed. After 39 minutes the patient became itchy and urticaria of the forehead was noticed. The patient felt sleepy. After 44 minutes urticaria of the back developed, his chest became tight and coughing started. The patient became dizzy. At this point his blood pressure and pulse were checked with the following results:

TABLE V

| | Blood Pressure | Pulse |
| --- | --- | --- |
| Standing | 62/50 | 88 |
| Sitting | 56/50 | 100 |
| Lying, 1 min | 104/70 | 76 |

Following the blood pressure and pulse tests, the patient became nauseated. After 1 hour and 39 minutes the blood pressure was still 60/50 on standing, however after 1 hour and 59 minutes the blood pressure was normal and there was no vasomotor instability. After 10 hours swelling of the hands and pain in the hand joints appeared which continued for 48 hours, gradually improving as the time passed.

The patient given lot number 84512A of my new clinical dextran material and noted as having a mild reaction had the following experience: the dextran was infused in 14 minutes, and 5 minutes after the completion of the infusion the patient became nauseated but did not vomit. The nausea disappeared within 5 more minutes and the patient was entirely normal.

Following infusion of dextran having less than 95% 1-6 linkages among the glucose units, there is evidence that antibodies are formed, indicating that such dextran compositions are antigens. In such tests blood serum from patients is first obtained and tested for nitrogen precipitable by dextran from the serum. The patients are then infused with dextran and three weeks later serum samples are again tested for nitrogen precipitable by dextran therefrom. The increase in the amount of nitrogen precipitable by dextran from the serum is a measure of antibody formation upon infusion of dextran and in turn a measure of the antigenicity of the dextran employed. The following table shows the results obtained when one mg. of Swedish dextran containing about 90% 1-6 linkages of glucose units was injected into 6 patients. The table also shows the cutaneous reaction which occurred if any.

TABLE VI

*Nitrogen precipitable by Swedish dextran from serum*

| Patient | Before µg. N/ml. | 3 weeks after µg. N/ml. | Cutaneous Reaction |
| --- | --- | --- | --- |
| H | 0.4 | 9.9 | 8 mm. wheal. 13 mm. erythema. |
| L | 0.2 | 24.0 | 9 mm. wheal. 13 mm. erythema. |
| P | 0 | 0.8 | |
| S | 0.1 | 1.1 | |
| B | 0.2 | 6.6 | 5 mm. wheal. |
| M | 0.2 | 3.1 | |

The following table shows the results obtained when 1 mg. of my new clinical dextran containing at least 95%

1–6 linkages of glucose units was injected into 13 patients. The only figure given is the amount of nitrogen precipitable by dextran from the serum taken 3 weeks after the injection for reasons which will be obvious from a reading of the table. There was no cutaneous reaction in any of the patients.

TABLE VII

*Nitrogen precipitable by dextran from serum*

| Patient | 3 weeks after μg. N/ml. |
|---|---|
| B | 0.5 |
| K | 0 |
| H | 0.1 |
| W | 0 |
| T | 0 |
| W | 0.1 |
| G | 0.5 |
| C | 1.6 |
| A | 0.1 |
| L | 0.7 |
| W | 0 |
| W | 0.1 |
| L | 0 |

In view of the results given above, it is quite obvious that my new clinical dextran material is different in kind from previously known dextran materials and is possessed of unexpected and beneficial advantage over the previously known compositions.

My new clinical dextran material can be obtained through the use of a specific strain of the organism *Leuconostoc mesenteroides*. The specific strain of the organism which I employ to obtain my new clinical dextran material is the Northern Regional Research Laboratories' strain B–512, a culture of which is on deposit at the Northern Regional Research Laboratories.

The following example is given as a description of the manner in which my new clinical dextran material may be obtained.

EXAMPLE I

A 950 gallon portion of a medium having the following composition:

| | Percent |
|---|---|
| Sucrose | 10 |
| Magnesium sulfate | 0.02 |
| Ammonium sulfate | 0.06 |
| Sodium chloride | 0.1 |
| Dipotassium hydrogen phosphate | 0.5 |
| Soluble yeast extract | 0.25 |

Distilled water to volume.

was inoculated with the organism *Leuconostoc mesenteroides* Northern Regional Research Laboratories' strain B–512. Fermentation was continued at 25° C. for 12 hours after which the pH was adjusted to 10.5 with sodium hydroxide and an equal volume of methanol added with agitation to precipitate the dextran. The precipitate was allowed to settle, the supernatant liquid decanted and the precipitate dissolved in water to a final volume of 660 gallons after which the pH was again adjusted to 10.5 and 1000 gallons of methanol added with agitation to again precipitate the dextran. The precipitated slurry after removal of the supernatant was re-dissolved in water to a final volume of 600 gallons and the pH of the solution then adjusted to 2.0 with hydrochloric acid to hydrolyze the dextran. Hydrolysis was continued until the solution had a viscosity of 3.0 centistokes and the pH then adjusted to 11.0 with 50% caustic. The dextran was then fractionally precipitated with methanol to obtain a clinical fraction having an average molecular weight of 75,000±25,000. The clinical fraction of dextran was then redissolved in water, deionized and dried to obtain the solid clinical dextran which for infusion purposes is then made up into a 6% aqueous solution.

Now having described my invention, what I claim is:

1. A sterile non-pyrogenic therapeutic infusion fluid comprising a 6 per cent aqueous solution of dextran molecules having a molecular weight determined by light scattering which averages about 75,000±25,000 with the lowest 5 to 10% being not less than 25,000 and the highest 5 to 10% being not more than 200,000, said dextran molecules having an average of at least about 95% 1:6 glucose linkages, and said solution having a viscosity ranging from about 2.5 to about 3.5 cs. at 25° C.

2. A composition comprising a mixture of essentially homogeneous dextrans having a molecular weight determined by light scattering ranging from between about 25,000 to about 200,000, said dextran having an average of at least about 95% 1–6 glucose linkages.

3. A composition comprising a mixture of essentially homogeneous dextrans having a molecular weight determined by light scattering ranging from between about 25,000 to about 200,000, said dextrans having an average of at least about 95% 1–6 glucose linkages, and said dextrans having a viscosity in 6% aqueous solution ranging from about 2.5 to about 4.0 centistokes at 25° C. when the average molecular weight of the dextran is 75,000±25,000 with the lowest 5 to 10% being not less than about 25,000 and the highest 5 to 10% being not more than about 200,000.

4. A composition comprising a mixture of essentially homogeneous dextrans having an average molecular weight determined by light scattering of 75,000±25,000, with the lowest 5 to 10% being not less than about 25,000 and the highest 5 to 10% being not more than about 200,000, said dextran material having a viscosity in 6% aqueous solution ranging from about 2.5 to about 4.0 centistokes at 25° C., and said dextran material having an average of at least about 95% 1–6 glucose linkages.

5. A sterile non-pyrogenic infusion fluid comprising an aqueous solution of a mixture of essentially homogeneous dextrans having a molecular weight determined by light scattering ranging from between about 25,000 to about 200,000, said dextrans having an average of at least about 95% 1–6 glucose linkages.

6. A sterile non-pyrogenic infusion fluid comprising an aqueous solution of a mixture of essentially homogeneous dextrans having a molecular weight determined by light scattering ranging from between about 25,000 to about 200,000, said dextrans having an average of at least about 95% 1–6 glucose linkages, and said fluid having a viscosity ranging from about 2.5 to about 4.0 centistokes at 25° C. when the average molecular weight of the dextrans is 75,000±25,000 with the lowest 5 to 10% being not less than about 25,000, and the highest 5 to 10% being not more than about 200,000 and when the concentration of the dextran in the fluid is 6%.

References Cited in the file of this patent

UNITED STATES PATENTS

| 2,437,518 | Gronwall et al. | Mar. 9, 1948 |
| 2,565,507 | Lockwood et al. | Aug. 28, 1951 |

FOREIGN PATENTS

| 583,378 | Great Britain | Dec. 17, 1946 |

OTHER REFERENCES

Fowler et al., Can. J. Research, 15, 489–490 (1937).

Ravdin, Journal American Medical Assn., 150, 11–12 (1952).

Abdel-Akher et al., Journal American Chemical Society, 74, 4970-1 (1952).

Bull et al., Chemical Abstracts, 45, 4888, (1951).

Hassid et al., Journal Biol. Chem., vol. 134, pp. 163 to 170, particularly p. 165, June 1940.

Jeanes et al., Journal Biol. Chem., vol. 176, pp. 603 to 615, particularly pp. 603 to 608, Nov. 1948.

Lohmar, J. A. C. S., vol. 74, No. 19, Oct. 5, 1952.

Answer to Complaint in Aktiebolaget Pharmacia, and Pharmacia Laboratories, Inc., plaintiff, v. The United States of America, defendant, pp. 7–82.

Journal of American Chemical Society, vol. 76, Oct. 20, 1954, pp. 5041 and 5042.